(12) United States Patent
Nault et al.

(10) Patent No.: US 12,179,269 B2
(45) Date of Patent: Dec. 31, 2024

(54) MOTION TECHNIQUE FOR DEPOSITION PROCESSES TO MANUFACTURE LEADING EDGE PROTECTIVE SHEATHS

(71) Applicant: U.S. Army Combat Capabilities Development Command, Army Research Laboratory, Adelphi, MD (US)

(72) Inventors: Isaac M. Nault, Bel Air, MD (US); Kenneth W. Young, Bear, DE (US); Gehn D. Ferguson, Baltimore, MD (US); Aaron T. Nardi, East Granby, CT (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 799 days.

(21) Appl. No.: 17/329,811

(22) Filed: May 25, 2021

(65) Prior Publication Data
US 2021/0402478 A1    Dec. 30, 2021

Related U.S. Application Data

(60) Provisional application No. 63/043,831, filed on Jun. 25, 2020.

(51) Int. Cl.
*B22F 10/38*    (2021.01)
*B22F 10/25*    (2021.01)
(Continued)

(52) U.S. Cl.
CPC ............. *B22F 10/38* (2021.01); *B22F 10/25* (2021.01); *B22F 10/34* (2021.01); *B22F 10/85* (2021.01);
(Continued)

(58) Field of Classification Search
CPC .......... B22F 10/38; B22F 10/25; B22F 10/34; B22F 10/85; B22F 2999/00; B22F 10/30;
(Continued)

(56) References Cited

U.S. PATENT DOCUMENTS

| | | |
|---|---|---|
| 9,140,130 B2 | 9/2015 | Mironets et al. |
| 9,765,435 B2 | 9/2017 | Zahiri et al. |

(Continued)

OTHER PUBLICATIONS

'Mold/Robotics Planning Concept for ACRB' (mold-robotics-concept.pptx) May 7, 2018 (ARL Internal Report).

(Continued)

*Primary Examiner* — Michael J Brown
(74) *Attorney, Agent, or Firm* — Christos S. Kyriakou

(57) ABSTRACT

A method of determining a tool path for an additive deposition on a surface, the method including receiving primary edges data of the surface of a three-dimensional (3D) object; calculating a number of raster lines for applying an additive deposition on the surface; mapping a raster pattern to the surface of the 3D object; calculating surface normal and rotational angles along the raster lines; calculating a nozzle velocity of an additive application used for producing the additive deposition on the surface; identifying curvature effects of the 3D object; and establishing an order of performing passes of the additive deposition on the surface based on a selected direction for performing the additive deposition and a consideration of a residual stress profile of a resulting deposit.

20 Claims, 12 Drawing Sheets

(51) Int. Cl.
  *B22F 10/34* (2021.01)
  *B22F 10/85* (2021.01)
  *B33Y 50/02* (2015.01)
  *B22F 10/80* (2021.01)
  *B29C 64/112* (2017.01)
  *B33Y 10/00* (2015.01)
  *F03D 1/06* (2006.01)

(52) U.S. Cl.
  CPC ............. *B33Y 50/02* (2014.12); *B29C 64/112* (2017.08); *B33Y 10/00* (2014.12); *F03D 1/0675* (2013.01)

(58) Field of Classification Search
  CPC ......... B22F 10/80; B33Y 50/02; B33Y 10/00; B29C 64/112; F03D 1/0675; Y02P 10/25
  USPC ....................................................... 700/119
  See application file for complete search history.

(56) References Cited

U.S. PATENT DOCUMENTS

| | | |
|---|---|---|
| 2011/0078896 A1 | 4/2011 | Calla et al. |
| 2011/0129600 A1 | 6/2011 | Das et al. |
| 2020/0156323 A1* | 5/2020 | Woytowitz ............. B33Y 50/02 |
| 2020/0230888 A1* | 7/2020 | Kim ....................... B29C 64/393 |
| 2020/0307174 A1* | 10/2020 | Woytowitz ............ B29C 64/393 |

OTHER PUBLICATIONS

'ARL Cold Spray AM Development: ACRB Progress Update Jul. 20, 2018' (ARL Update Jul. 23, 2019.pptx) ARL Internal Report.
'Airfoil Deposition Modeling, Path Planning, Robotics, CT Scanning Update' (013019_modelingupdate.pptx)—Jan. 30, 2019 (ARL Internal Report).
'Cold Spray Repair (Task 2) and Additive Manufacturing' (ManTech HFW Task 2 and CRADA 062118.pptx)—Jun. 21, 2018 (Boeing Report).

* cited by examiner

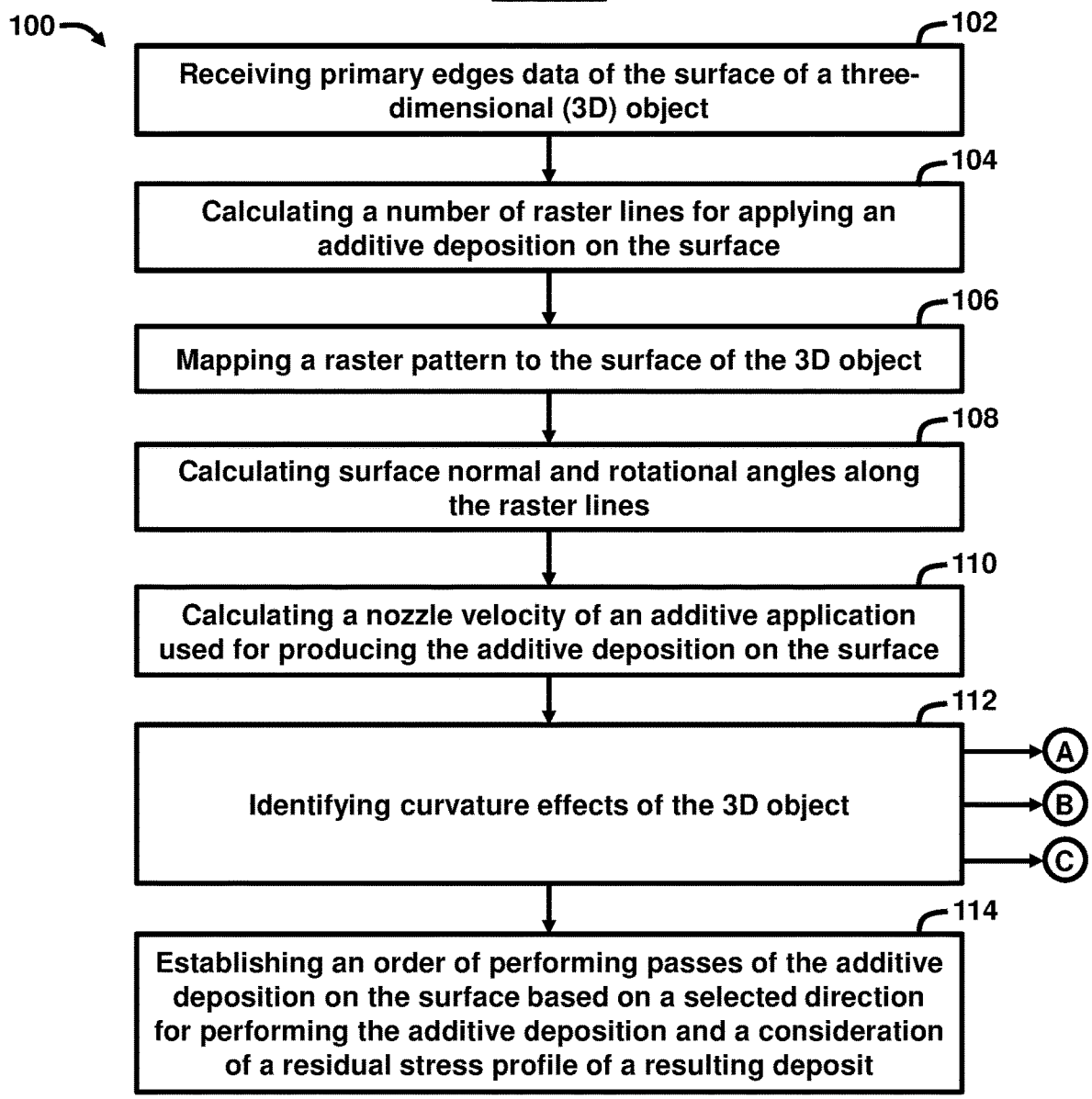

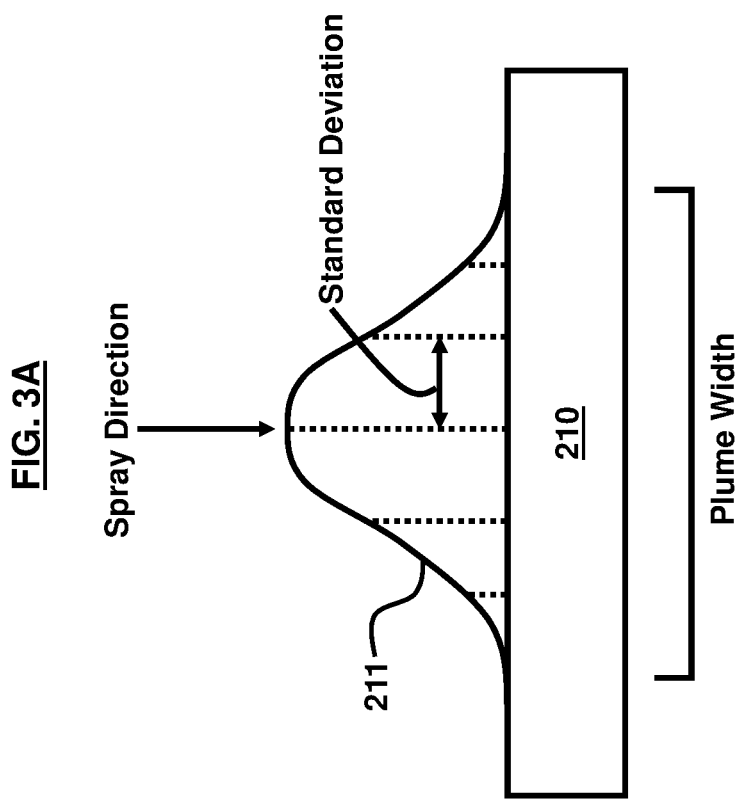

MOTION TECHNIQUE FOR DEPOSITION PROCESSES TO MANUFACTURE LEADING EDGE PROTECTIVE SHEATHS

CROSS-REFERENCE TO RELATED APPLICATION(S)

This application claims the benefit of U.S. Provisional Patent Application No. 63/043,831 filed on Jun. 25, 2020, which is incorporated herein by reference in its entirety.

GOVERNMENT INTEREST

The embodiments herein may be manufactured, used, and/or licensed by or for the United States Government without the payment of royalties thereon.

BACKGROUND

Technical Field

The embodiments herein generally relate to additive deposition manufacturing processes, and more particularly to determining tool paths for performing additive deposition processes.

Description of the Related Art

Rotor blade erosion caps are currently made by electroformed nickel plating. This is a process that generally results in a varied deposited thickness profile. Deposition rates can be increased locally, forming an intentional thickness gradient, but the final thickness profile is difficult to precisely control, and the preferential deposition rates are known to cause excess plating and material defects. Therefore, significant post grinding and/or machining is required to achieve the final designed shape, particularly around the trailing edges. Post-grinding and machining can require many hours of labor, thus making the process longer and more expensive. Therefore, there is a need for a new deposition technique that minimizes the amount of subtractive manufacturing that is required, thus reducing manufacturing time and expense.

Cold spray, kinetic spray, cold gas dynamic spray, or supersonic particle deposition are solid-state powder deposition processes in which 10-50 micron diameter metal particles are accelerated to speeds of up to 2000 m/s in a heated supersonic gas stream. At such high speeds, particles bond with nearly any metallic surface with which they come into contact causing a deposit to form. A cold spray applicator may be attached to the end of a multi-axis robot arm to precisely control the position and orientation of the tool control point (TCP). A robotic motion plan is the path, the position and orientation of the TCP as a function of time, that, when followed by the robot, results in the powder forming a specific deposit shape.

Cold spray has been used to form protective strips on airfoil leading edges in the past, such as described in U.S. Pat. No. 9,140,130 and U.S. Patent Application Publication No. US 2011/0129600, the complete disclosures of which, in their entireties, are herein incorporated by reference for the purposes of providing the scope of the conventional solutions, and not for limitation purposes. These conventional solutions assert the use of cold spray to manufacture a specific part, focusing more on the cold spray process itself, but do not describe robotic motion plans for realizing a near-net-shape part with non-uniform thickness. In the '130 patent, the non-uniform thickness is achieved by other means altogether, using a combination of multiple molds and machining operations. In the '600 patent publication, the protective strip has uniform thickness, and the robotic motion plan is not described. Therefore, while these solutions may have been suitable for their specific applications, there remains a need in the industry to develop a solution to improve additive deposition manufacturing processes by improving the robotic motion plan for performing the deposition.

SUMMARY

In view of the foregoing, an embodiment herein provides a method of determining a tool path for an additive deposition on a surface, the method comprising receiving primary edges data of the surface of a three-dimensional (3D) object; calculating a number of raster lines for applying an additive deposition on the surface; mapping a raster pattern to the surface of the 3D object; calculating surface normal and rotational angles along the raster lines; calculating a nozzle velocity of an additive application used for producing the additive deposition on the surface; identifying curvature effects of the 3D object; and establishing an order of performing passes of the additive deposition on the surface based on a selected direction for performing the additive deposition and a consideration of a residual stress profile of a resulting deposit.

The primary edges may comprise a first side edge, a second side edge, a first trailing edge, a second trailing edge, and a leading edge. The number of raster lines may be calculated by dividing a length of the first side edge by a baseline line spacing parameter and rounding to a nearest integer. The raster pattern may be mapped to the surface of the 3D object by aligning the primary edges and allowing remaining raster lines to elastically deform therebetween. The nozzle velocity of the additive deposition may be calculated by:

$$\text{local speed} = \text{baseline speed} \times \frac{\text{number of passes} \times \text{baseline thickness per pass}}{\text{local prescribed thickness}} \times \frac{\text{baseline line spacing}}{\text{local line spacing}}.$$

The method may comprise correcting the curvature effects by calculating a curvature corrected surface of the 3D object; and mapping the raster pattern to the curvature corrected surface instead of an actual surface of the 3D object. The method may comprise correcting the curvature effects by mapping the raster pattern to each new surface of the 3D object that is generated after deposition of each layer on the surface. The method may comprise correcting the curvature effects by calculating a compensation factor that is a function of a local radius of curvature of the surface; and using the compensation factor to determine the nozzle velocity. The establishing of the order of performing the additive deposition on the surface may comprise beginning with a widest layer and continuing inward on the surface. The establishing of the order of performing the additive deposition on the surface may comprise beginning with a narrowest layer and continuing outward on the surface.

Another embodiment provides a machine-readable storage medium comprising computer-executable instructions that when executed cause a processor of a robotic additive applicator device to receive primary edges data of a surface of a three-dimensional (3D) object; calculate a number of raster lines for applying an additive deposition on the surface; map a raster pattern to the surface of the 3D object; calculate surface normal and rotational angles along the raster lines; calculate a nozzle velocity of an additive application used for producing the additive deposition on the surface; identify curvature effects of the 3D object; and establish an order of performing passes of the additive deposition on the surface based on a selected direction for performing the additive deposition and a consideration of a residual stress profile of a resulting deposit.

The primary edges may comprise a first side edge, a second side edge, a first trailing edge, a second trailing edge, and a leading edge. The number of raster lines may be calculated by dividing a length of the first side edge by a baseline line spacing parameter and rounding to a nearest integer. The raster pattern may be mapped to the surface of the 3D object by aligning the primary edges and allowing remaining raster lines to elastically deform therebetween. The nozzle velocity of the additive deposition may be calculated by $$\text{local speed} = \text{baseline speed} \times \frac{\text{number of passes} \times \text{baseline thickness per pass}}{\text{local prescribed thickness}} \times \frac{\text{baseline line spacing}}{\text{local line spacing}}.$$

The instructions, when executed, may further cause the processor to correct the curvature effects by calculating a curvature corrected surface of the 3D object; and mapping the raster pattern to the curvature corrected surface instead of an actual surface of the 3D object. The instructions, when executed, may further cause the processor to correct the curvature effects by mapping the raster pattern to each new surface of the 3D object that is generated after deposition of each layer on the surface. The instructions, when executed, may further cause the processor to correct the curvature effects by calculating a compensation factor that is a function of a local radius of curvature of the surface; and using the compensation factor to determine the nozzle velocity. The establishing of the order of performing the additive deposition on the surface may comprise beginning with a widest layer and continuing inward on the surface. The establishing of the order of performing the additive deposition on the surface may comprise beginning with a narrowest layer and continuing outward on the surface.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1A is a flow diagram illustrating a method of determining a tool path for an additive deposition on a surface, according to an embodiment herein;

FIG. 3A is a schematic diagram illustrating a cold spray spot shape, according to an embodiment herein;

DETAILED DESCRIPTION

Figure 1B:
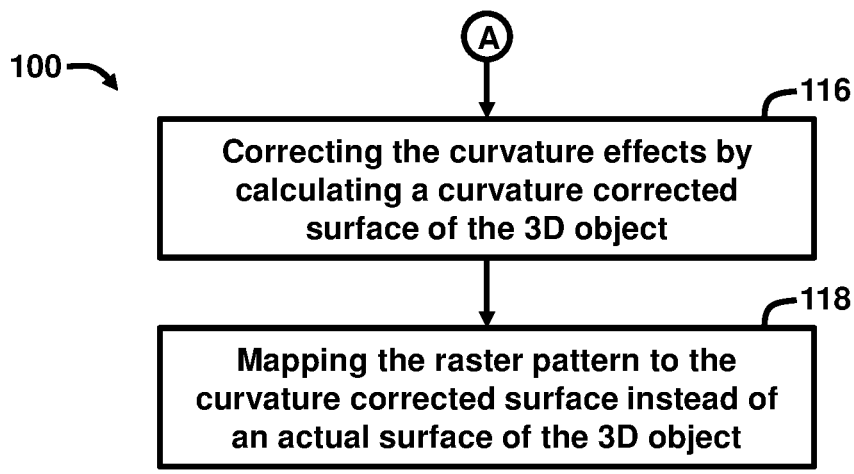
FIG. 1B is a flow diagram illustrating a first method of correcting the curvature effects of a 3D object, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide the mapping of a raster pattern to a complex surface in such a way that results in non-uniform spacing between consecutive lines and the means to achieve steep variations in the deposit thickness by manipulation of the applicator velocity. The embodiments herein improve upon conventional methods in which only constant thickness may be deposited, thickness variations are very limited in magnitude, or a significant amount of over-spray is required to meet the desired shape. The embodiments herein minimize the amount of waste material and post-subtractive-machining required. Moreover, the embodiments herein enable the manufacture of parts with large thickness gradients using a spray technology having a Gaussian-shaped profile. For example, thickness gradients as large as 0.25 mm per mm of surface length or 12.5 layer thicknesses per plume width can be achieved in accordance with the embodiments herein. Referring now to the drawings, and more particularly to FIGS. 1A through 9, where similar reference characters denote corresponding features consistently throughout the figures, there are shown preferred embodiments. In the drawings, the size and relative sizes of components, layers, and regions, etc. may be exaggerated for clarity.

The embodiments herein utilize a novel robotic motion plan for forming additive deposition, such as cold spray deposits, on complex-shaped surfaces, such as rotor blades directly or indirectly or on rotor blade-shaped build platforms, with well-controlled non-uniform thickness.

As used herein, the following terms are defined as follows:

Nozzle: A part through which the heated powder-carrying gas is accelerated, and a stream of particles is directed towards a substrate.

Powder Plume: The stream of particles exiting the nozzle. Generally, the plume is contained within the envelope of the exit radius of the nozzle.

Applicator: A device or apparatus connecting the nozzle to the heated gas stream and robot arm.

Tool Control Point (TCP): The point, relative to the cold spray applicator (or tool), at which the robotic motion is prescribed in Cartesian space. In cold spray, the point is at the center of the powder plume at a prescribed distance (standoff distance) from the nozzle exit.

Standoff Distance: The distance between the surface being sprayed and the nozzle exit.

Spot-shape: The shape a deposit would take if held for a brief instant over a fixed point.

FIGS. 1A through 1D are flow diagrams illustrating a method 100 of determining a tool path for an additive deposition on a surface. As shown in FIG. 1A, the method 100 comprises receiving (102) primary edges data of the surface of a three-dimensional (3D) object; calculating (104) a number of raster lines for applying an additive deposition on the surface; mapping (106) a raster pattern to the surface of the 3D object; calculating (108) surface normal and rotational angles along the raster lines; calculating (110) a nozzle velocity of an additive application used for producing the additive deposition on the surface; identifying (112) curvature effects of the 3D object; and establishing (114) an order of performing passes of the additive deposition on the surface based on steps (102) through (112). The establishing of the order of performing the additive deposition on the surface in step (114) may comprise beginning with a widest layer and continuing inward on the surface. Conversely, the establishing of the order of performing the additive deposition on the surface in step (114) may comprise beginning with a narrowest layer and continuing outward on the surface.

The primary edges may comprise a first side edge, a second side edge, a first trailing edge, a second trailing edge, and a leading edge. The number of raster lines may be calculated by dividing a length of the first side edge by a baseline line spacing parameter and rounding to a nearest integer. The raster pattern may be mapped to the surface of the 3D object by aligning the primary edges and allowing remaining raster lines to elastically deform therebetween.

The nozzle velocity of the additive deposition may be calculated, in step 110, by Equation (1):

$$\text{local speed} = \text{baseline speed} \times \frac{\text{number of passes} \times \text{baseline thickness per pass}}{\text{local prescribed thickness}} \times \frac{\text{baseline line spacing}}{\text{local line spacing}}. \quad (1)$$

Figure 1C:
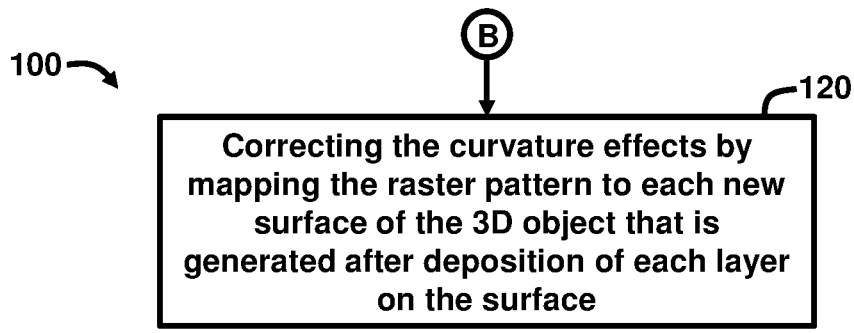
FIG. 1C is a flow diagram illustrating a second method of correcting the curvature effects of a 3D object, according to an embodiment herein.
Figure 1D:
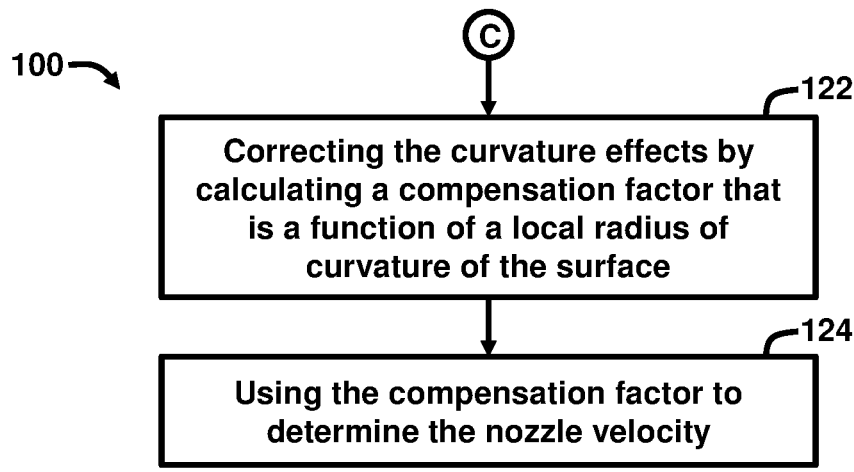
FIG. 1D is a flow diagram illustrating a third method of correcting the curvature effects of a 3D object, according to an embodiment herein.

As shown in FIG. 1B, the method 100 may comprise correcting (116) the curvature effects by calculating a curvature corrected surface of the 3D object; and mapping (118) the raster pattern to the curvature corrected surface instead of an actual surface of the 3D object. As shown in FIG. 1C, the method 100 may comprise correcting (120) the curvature effects by mapping the raster pattern to each new surface of the 3D object that is generated after deposition of each layer on the surface. As shown in FIG. 1D, the method 100 may comprise correcting (122) the curvature effects by calculating a compensation factor that is a function of a local radius of curvature of the surface; and using (124) the compensation factor to determine the nozzle velocity.

Figure 2A:
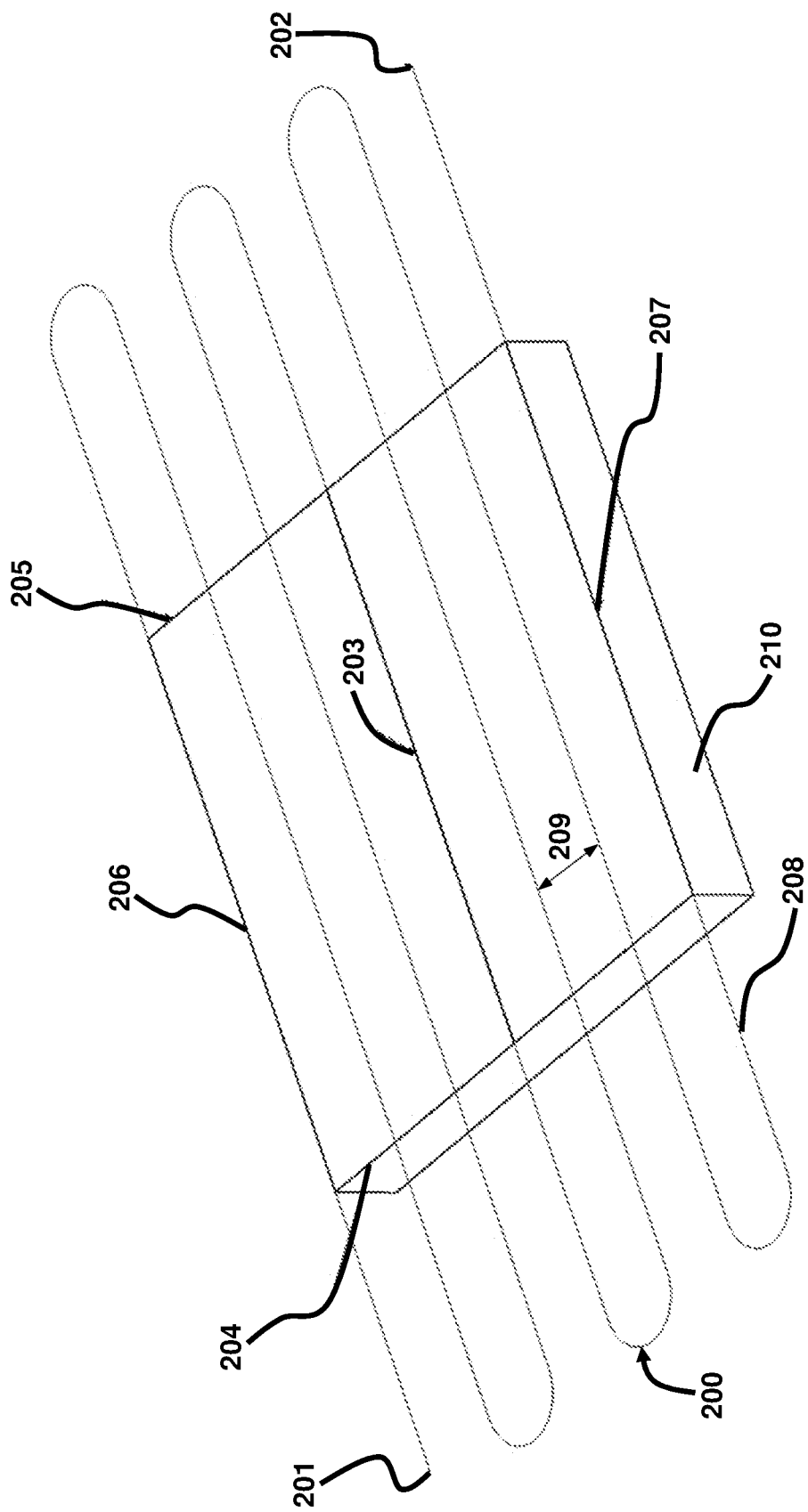
FIG. 2A is a schematic diagram illustrating a perspective view of a raster pattern over a flat plate, according to an embodiment herein.
Figure 2B:
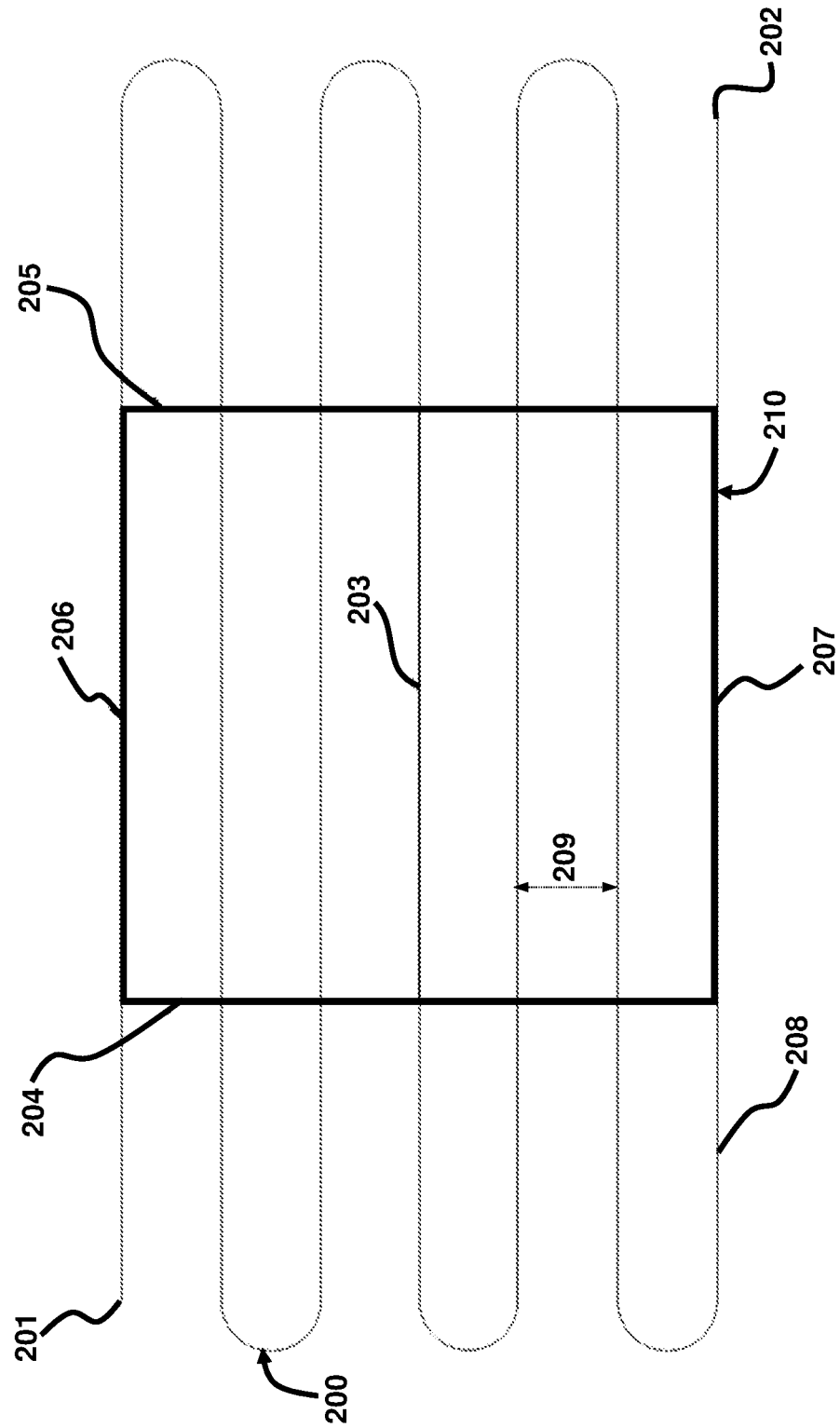
FIG. 2B is a schematic diagram illustrating a top view of a raster pattern over a flat plate, according to an embodiment herein.

An example cold spray robotic motion path is a raster pattern for forming deposits on flat surfaces with uniform thickness. Such a path 200 is illustrated in FIGS. 2A and 2B. The path 200 begins at the path start 201 and comprises alternating straight lines that are uniformly spaced and traversed by a robot at a uniform speed until the path end 202. The line spacing 209 is a key variable and should be set to a value that is small with respect to the width of the powder plume. The number of lines is determined by dividing the desired spray width by the line spacing 209. When the robot turns around at the end of each line, it is inevitable that it will decelerate and then accelerate to get back to the prescribed speed. When spraying onto a plate 210, the raster lines are typically extended beyond the extent of the plate 210 so that material will not be deposited while the robot slows to turn around. This practice avoids uncontrolled thickness variations of the deposit in the turn-around region. The distance by which the lines extend beyond the edge of the plate 210 is called the over-spray distance 208. The plate 210 may be defined by a centerline (leading edge) 203, a first edge 204, a second edge 205, a trailing edge 206, and a trailing edge 207.

Figure 3B:
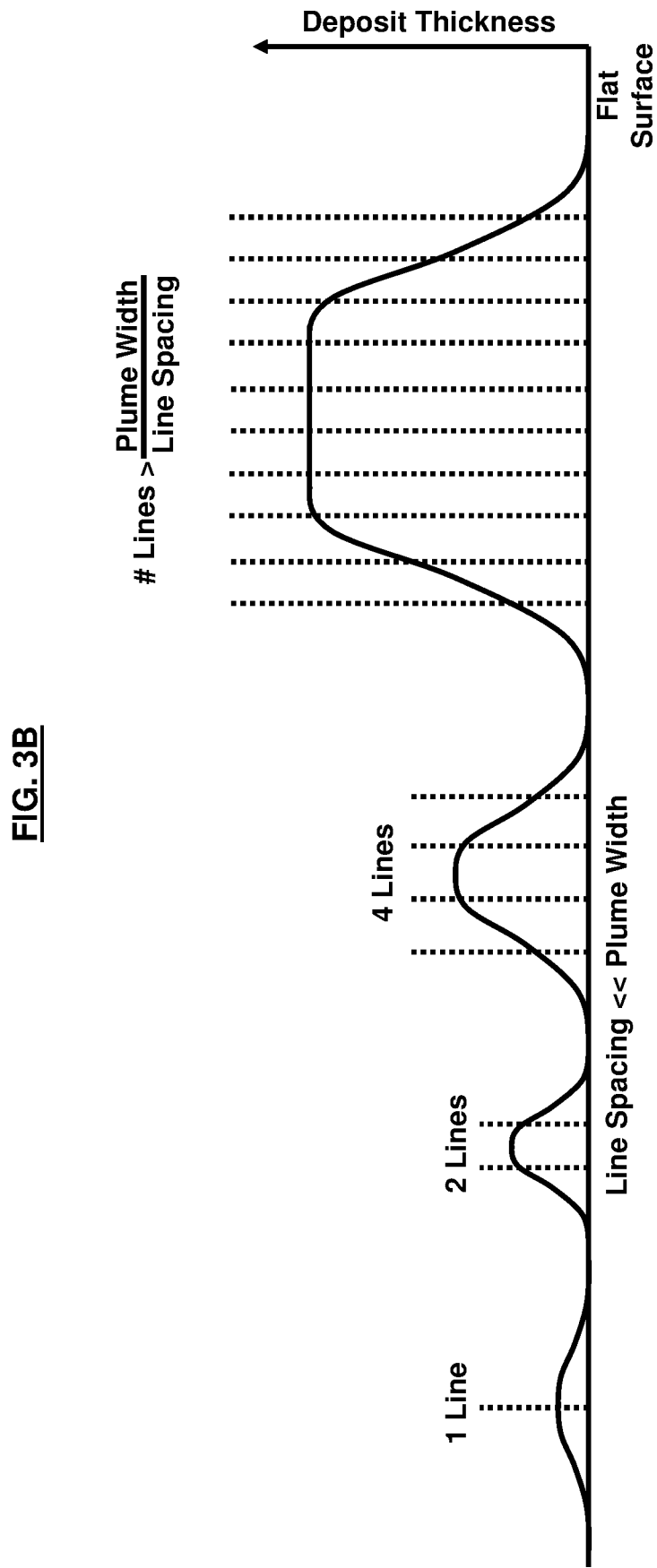
FIG. 3B is a schematic diagram illustrating a plateauing effect of multiple closely-spaced lines of forming a cold spray spot shape, according to an embodiment herein.

The flat raster pattern leads to a uniform thickness deposit due to the phenomenon of closely-spaced line stack-up. An example cold spray spot shape formed by a deposit 211 on a plate 210 is shown in FIG. 3A, with reference to FIGS. 2A and 2B. The spot shape can be characterized by the plume width, which is the width of the deposit envelope, and the standard deviation. The plume width is usually about four to six times the standard deviation. During a flat raster robotic motion, the line spacing 209 is required to be small compared to the plume width. Typically, the line spacing 209 is about 1/10th of the plume width. The result of stacking up multiple, closely spaced lines is shown in FIG. 3B. When a single line is deposited, the thickness resembles the spot shape of deposit 211 of FIG. 3A. When two or four lines are sprayed, the deposit still resembles a mound, but with greater height. When the number of lines exceeds the value of dividing the plume width divided by the line spacing 209, the deposit plateaus, creating a very smooth flat surface on the top. This is the phenomenon that enables a uniform thickness to be deposited onto the flat plate 210.

The thickness of the plateau can be mathematically related to the traverse speed and the line spacing. For example, a given cold spray process may produce a deposit with known thickness A when sprayed onto a flat plate 210 using a basic raster pattern with speed A and line spacing A. If the same cold spray process is used with speed B and line spacing B, the thickness B can be determined by the relation in Equation (2):

$$\text{thickness } B = \text{thickness } A \times \frac{\text{speed } A}{\text{speed } B} \times \frac{\text{line spacing } A}{\text{line spacing } B} \qquad (2)$$

Figure 4:
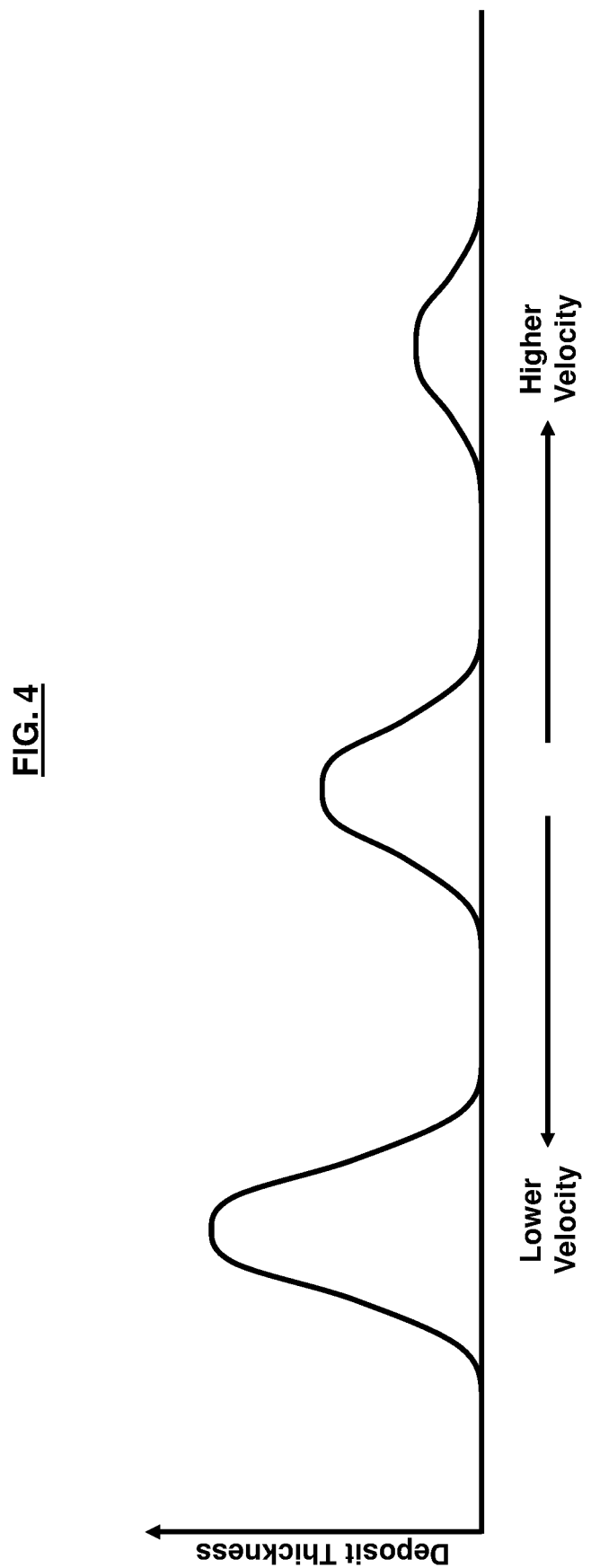
FIG. 4 is a graphical diagram illustrating the effects of robot traverse speed and the deposit thickness on a cold spray spot shape, according to an embodiment herein.

When the traverse speed is increased, the applicator nozzle spends less time over the plate 210 per unit area, so the amount of material that is deposited is less. The effects of traverse speed are illustrated in FIG. 4, with reference to FIGS. 2A through 3B. When the line spacing 209 is increased, the thickness also decreases because the amount of deposited material per unit area is less. This relationship only holds for speeds and line spacings that are close in value to the baseline speed A and line spacing A. Most importantly, the line spacing 209 must be less than the plume width or else the plateauing phenomenon will not occur. If the line spacing is less, but close to the plume width in value, the outer surface will appear wavy. Both the speed and line spacing should also be held close to the baseline values because of unintended physical consequences on the cold spray process. The relationship in Equation (2) is based solely on statistical effects and does not consider the more advanced physical processes underlying cold spray deposition. One aspect of the embodiments herein is that robot traverse speed and line spacing may be locally varied, according to Equation (2) to achieve well-controlled non-rectangular shapes and non-uniform thickness profiles. This discovery is non-trivial because Equation (1) has been derived for a flat plate 210 in which the line spacing 209 and speed are uniform. It is not intuitively obvious that the same relationship will hold when the speed and line spacing are locally varied.

Figure 5:
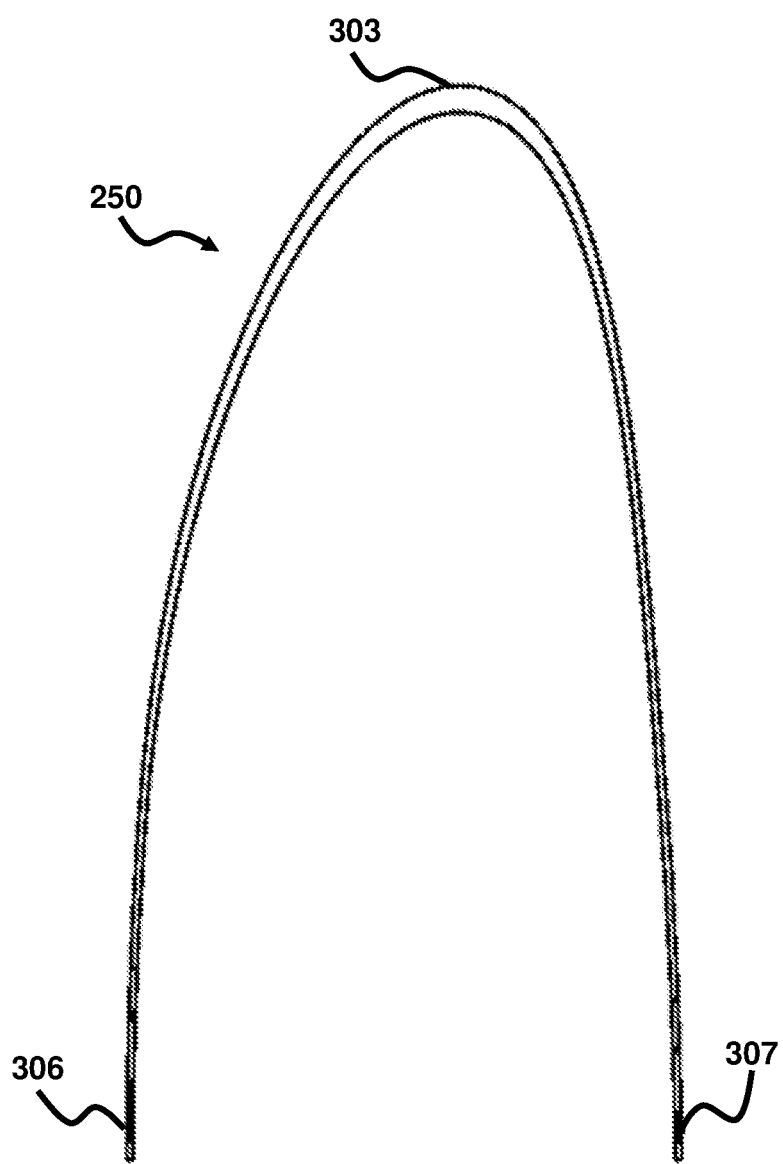
FIG. 5 is a schematic diagram illustrating a cross-sectional view of an erosion cap, according to an embodiment herein.

Rotor blades are complex parts with shapes that have been aerodynamically optimized for a specific purpose such as generating lift for a helicopter. Many rotor blades having leading edge protection such as erosion caps that protect the blade material from elements in the air. Erosion caps fit over the rotor blade, bearing the same shape as the blade and having non-uniform thickness, generally thicker near the leading edge where most erosion occurs and thinner near the trailing edge to minimize the added weight of the cap which is a detriment to the aerodynamic properties of the blade. A cross-section of a typical erosion cap 250 is shown in FIG. 5. The ratio between the thickness of the leading edge 303 and the thicknesses of the trailing edges 306, 307 may be as high as 10:1. Depending on the length of the contour, this can lead to thickness gradients on the order of 0.1 mm thickness per mm surface length.

In view of the foregoing, an example herein provides a robotic motion plan for forming a cold spray deposit bearing the shape of an erosion cap on the rotor blade or an identically-shaped rotor blade mold. The embodiments herein are equally applicable to other applications in which a non-uniform thickness deposit is desired on an airfoil-like shape. However, for purposes of explanation and context, an example of a rotor blade is provided herein and shown in the drawings. Nonetheless, the embodiments herein are not restricted to application to only a rotor blade.

Figure 6:
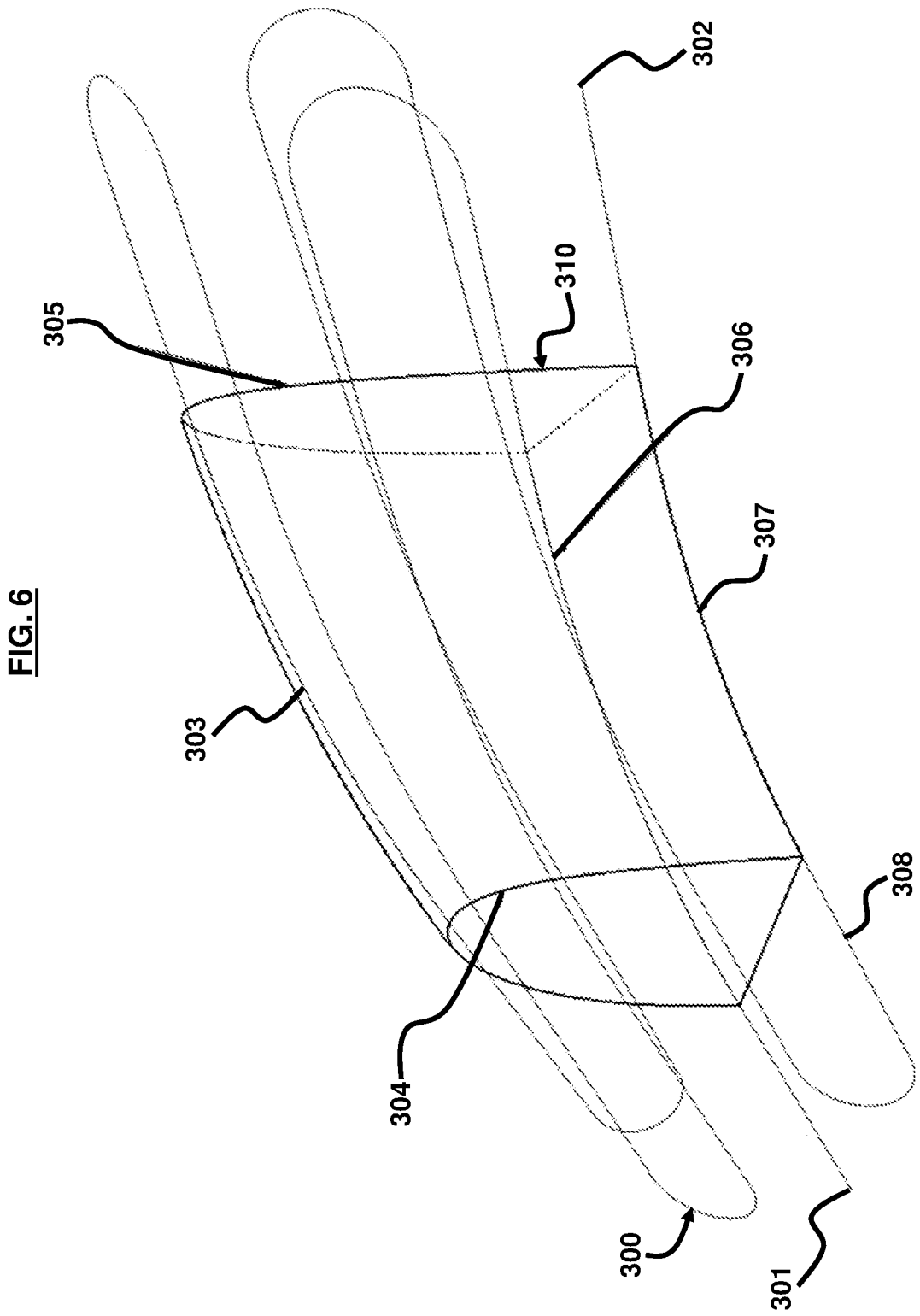
FIG. 6 is a schematic diagram illustrating a mapping raster pattern to a rotor blade surface, according to an embodiment herein.

The embodiments herein work by mapping or 'elastically-deforming' the basic raster pattern described above to the complex surface of the rotor blade. This mapping 300 is illustrated in FIG. 6. There are five primary 'edges' 303-307 that are identified on the rotor blade 310 for the mapping 300 to occur. On the flat plate 210 of FIGS. 2A and 2B, edge 204 and edge 205 are the two side edges of the plate 210 perpendicular to the traverse direction of the raster. On the rotor blade 310 of FIG. 6, edge 304 and edge 305 are mapped to the two side contours, on either end of the span of the rotor blade 310. Edge 304 is assigned to the smaller of the two edges. Edges 304, 305 are assigned to the span-wise sides to minimize the amount of material-wasting robot turn-arounds. Initially and experimentally, the raster pattern was expected to be mapped such that edge 304 and edge 305 align to the trailing edges 306, 307 of the rotor blade 309. By doing it this way, the need for using variable line spacing and speed would be eliminated. However, this method would require very abrupt rotations about the leading edge 303. Moreover, this raises concerns about the ability of the robot arm to make such an abrupt change as well as concerns about wear on the hot gas hose connected to the applicator. Further, the approach requires significantly more robot turn-arounds, wasting material and time as indicated above. Accordingly, it was determined that the edges 304, 305 should be aligned to the opposite span-wise sides of the rotor blade 309, which led to the techniques provided by the embodiments herein. The mapping 300 begins at the robotic path start 301 and terminates at the robotic path end 302. The rotor blade 310 is further defined by the leading edge 303 and the trailing edges 306, 307. The overspray distance 308 is also depicted in FIG. 6 as the area extending beyond the sides of edges 304, 305 where the robotic arm turn-around occurs during the deposition process.

On the flat plate 210 of FIGS. 2A and 2B, trailing edge 206 and trailing edge 207 are the two side edges of the spray area parallel to the traverse direction of the raster. On the rotor blade 310 of FIG. 6, trailing edges 306, 307 are mapped to the trailing edges 306, 307 of the erosion cap 250 of FIG. 5. On the flat plate 210 of FIGS. 2A and 2B, the leading edge 203 is a line that bisects trailing edge 206 and trailing edge 207. On the rotor blade 310 of FIG. 6, the leading edge 303 is mapped to the actual leading edge 303 of the erosion cap 250 of FIG. 5. After these edges are determined, the remaining raster lines are 'elastically' projected to the surface of the rotor blade 310. This can be visualized by imagining 'stretching' the flat raster pattern over the surface of the rotor blade 310 and aligning the critical edges. The overspray 308 extensions are also projected to an extrapolation of the surface of the rotor blade 310 to maintain a smooth transition.

An underlying issue with robotic motion planning is that the robot will not always follow the path prescribed exactly. Paths that require abrupt joint motions are not realizable due to the limitations of the motor speed of each joint. When fed a path, a robot finds a realizable path by interpolation, but the algorithms governing interpolation are usually kept invisible to the programmer. In view of this challenge, the selection and alignment of the leading edge 303 is one unique aspect of the embodiments herein. The leading edge 303 is where the highest curvature of the rotor blade 310 (and corresponding erosion cap 250) is found. By aligning the leading edge 303, raster lines are not allowed to cross over the leading edge 303 during the traverse from one side of the rotor blade 310 to the other. This creates raster lines that are as smooth as possible, avoiding rapid tool orientation motions that could slow down the robot arm or result in inaccuracies.

Figure 7:
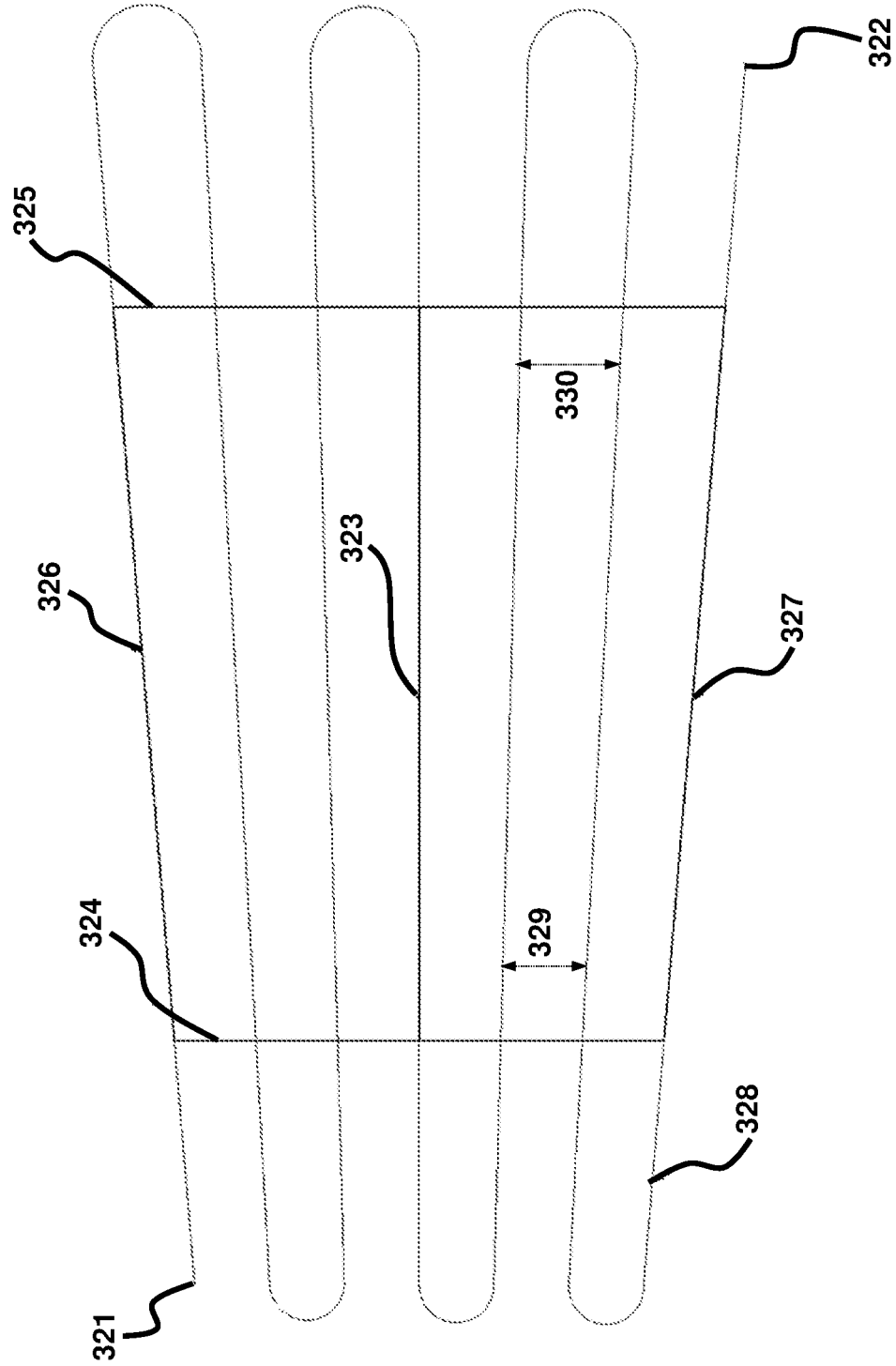
FIG. 7 is a schematic diagram illustrating a mapping raster pattern to a flat trapezoid shape, according to an embodiment herein.

During the mapping process, the line spacing will inevitably be altered to fit the shape of the rotor blade 310. In general, edge 304 and edge 305 on the rotor blade 310 will not have the same length. Therefore, the line spacing must change from one side to the other. An example of this change is in the mapping to a flat trapezoid shape as illustrated in FIG. 7. In this example, the line spacing 329 is less than the line spacing 330. Experimentally, the uniform thickness deposit was successfully formed in the shape of the trapezoid by locally varying the traverse speed according to Equation (2) as a function of the local line spacing 329, 330. In FIG. 7, the corresponding path start 321 and path end 322 are shown as well as the leading edge 323, edge 324, edge 325, trailing edge 326, trailing edge 327, and overspray distance 328.

Again, with reference to FIG. 6, on the rotor blade 310, the number of raster lines are determined by consideration of the length of edge 304. The deposit is formed by an additive deposition process, such as a cold spray process, that has been evaluated on flat plates (e.g., plate 210) using some baseline line spacing A. The number of lines used in the raster is then the length of edge 304 divided by the baseline line spacing A. The line spacing on edge 305 is then equal to the length of edge 305 divided by the number of lines. Since edge 305 is longer than edge 304, the line spacing on edge 305 will be greater than on edge 304. This convention is chosen so that the speeds needed on edge 305 will generally be slower than on edge 304. As such, it is generally easier and more accurate for a robot to move slower than it is to move faster.

Once the raster pattern has been mapped 300 to the surface of the rotor blade 310, the surface normal is calculated along each line. The robot motion is programmed to maintain the nozzle spray direction antiparallel to the surface normal along the path. This can be accomplished by calculating the Tait-Bryan angles of the surface normals. Most robot arm manufactures allow the TCP to be defined by three cartesian coordinates locating the TCP in space and three Tait-Bryan angles specifying the orientation of the tool.

The deposition may be a multi-layer process because the thickness of the erosion cap 250 is much thicker than the thickness of a single pass of the raster path. The thickness of the leading edge 303 may be 10-20 times the per-pass thickness. This thickness can be realized by slowing the traverse speed by 10-20 times, but the resulting material properties would likely be different from that evaluated at the baseline speed. Therefore, 10-20 layers are applied at the leading edge 303. The thickness of the trailing edges 306, 307 may be as much as ten times less than the thickness of the leading edge 303, requiring only a few layers of cold spray material. Therefore, each line of the raster may be assigned a different number of passes to meet the prescribed thickness profile. The number of passes can be calculated as the prescribed thickness divided by the per-pass thickness and rounding down to the nearest integer. The nozzle velocity may be calculated locally so as to compensate for any additional variations in the line spacing or margin of error due to rounding the number of passes to the nearest integer. This calculation is shown in Equation (1) above.

One issue with projecting flat raster patterns to a curved surface such as on a rotor blade 310 is the effect of curvature on projected deposit thickness. On a curved surface, the amount of deposit volume per unit surface area is greater than on a flat surface with the same thickness. The embodiments herein address this issue in different ways. A first approach is to calculate a 'curvature-correcting' surface and map the basic raster to the corrected surface instead of the actual surface of the rotor blade 310. The corrected surface is determined by enforcing that the surface area times the thickness is equal to the actual volume of the desired deposit. A second approach is to repeat the mapping process after each layer. After a layer is added, the mapping process is repeated on the new projected outer surface of the deposit. This has the effect of compensating for curvature by slowly increasing the number of lines as the deposit builds. A third approach is to calculate a theoretical compensation factor that is a function of the local radius of curvature and build this into Equation (1). Each approach choice depends on the particulars of the problem. The first approach works very well on lightly-curved surfaces. The second approach is the most accurate, but also the most complex solution to program. The third approach is the simplest to implement but requires theoretical integral calculus calculations and is the least accurate.

Figure 8:
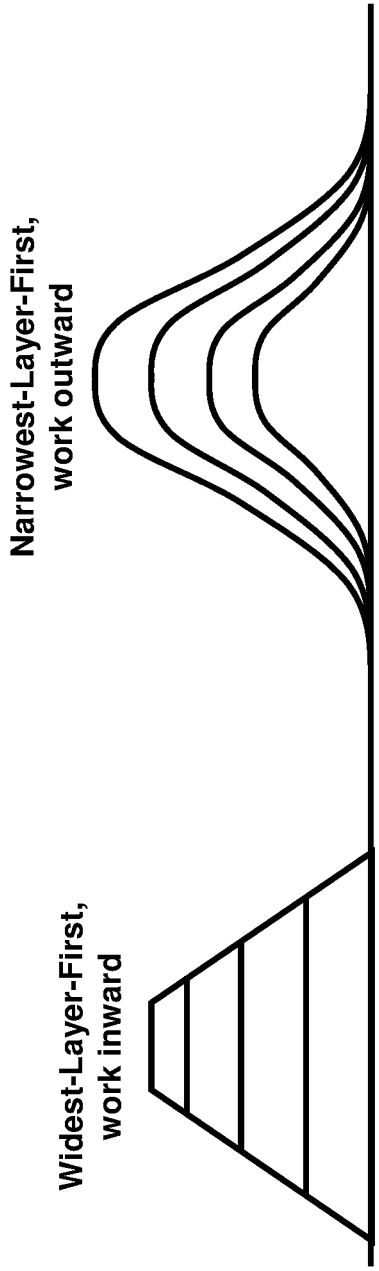
FIG. 8 is a schematic diagram illustrating alternative order-of-deposition techniques, according to an embodiment herein.
Figure 9:
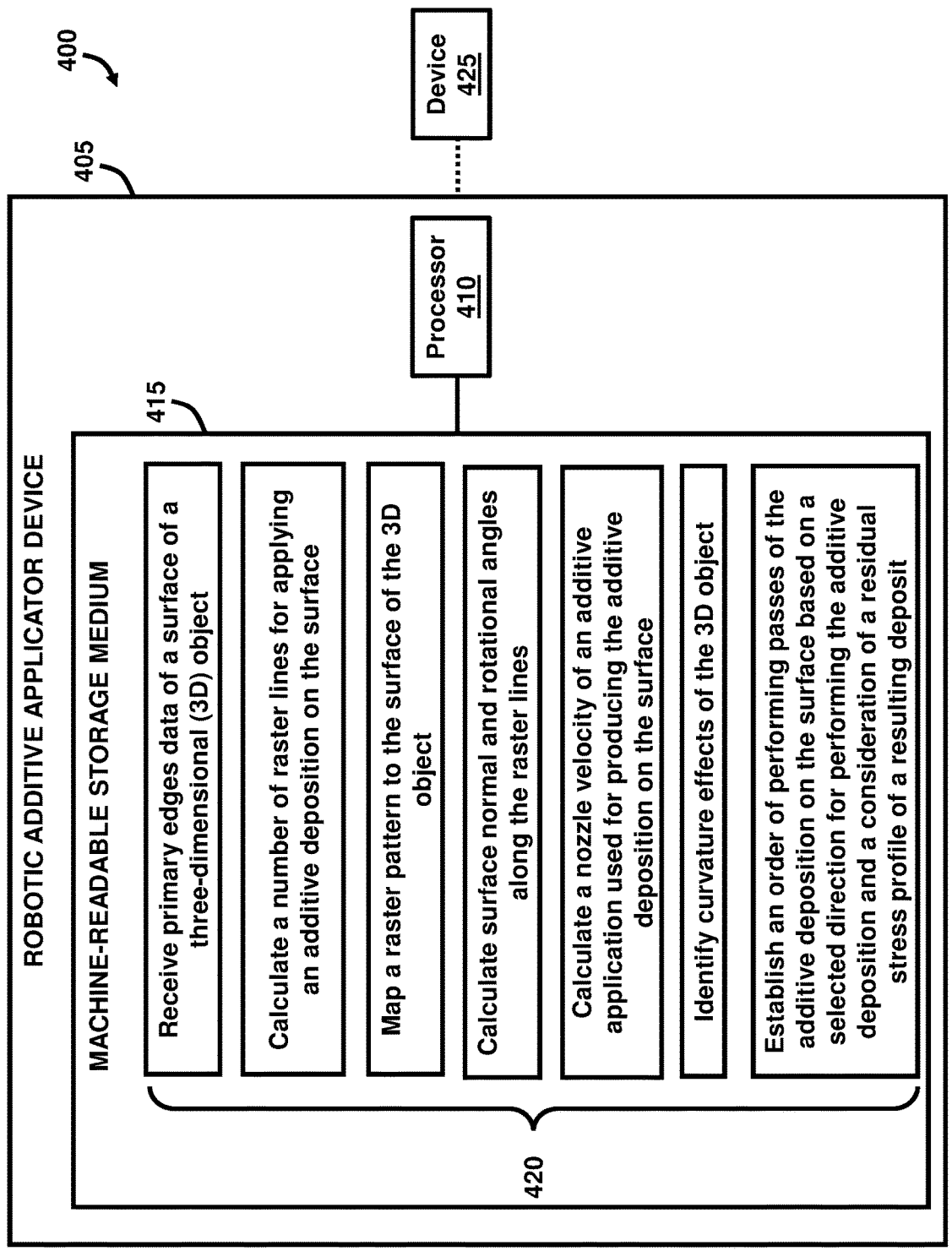
FIG. 9 is a system for determining a tool path for an additive deposition on a surface, according to an embodiment herein.

Another consideration is the order of layers. Since each line has a different number of passes, the order of deposition makes a difference. The plan can start with the widest layer and work inward or start with the narrowest layer and work outward. These two approaches are illustrated in FIG. 8. Starting with narrowest layer and working outward results in the best surface finish. That is because the final layer will cover the entire surface and smooth over the 'steps' between past layers. However, the order of deposition will influence the final residual stress profile found in the deposit. The residual stress profile can be determined using advanced finite element deposition modeling with thermal loading and is shape-dependent. If the residual stress profile is not important, the user can employ the narrowest-layer-first approach. If the residual stress profile is important, a finite element analysis can be carried out to determine which strategy is better.

The robotic motion plan provided by the embodiments herein can create deposits that conform to near-net-shape. Post-machining or grinding may be utilized to achieve the desired surface finish of the part, but the amount of material that is required to be grinded away is minimized using the process provided by the embodiments herein. According to an example, the following steps may be used to manufacture the rotor blade erosion cap 250 using the method 100 of FIGS. 1A through 1D provided by the embodiments herein.

First, the five critical edges of the surface of the rotor blade 310 is determined in accordance with step (102); i.e., the two side edges 304, 305, the two trailing edges 306, 307, and the leading edge 303. Second, the number of lines is calculated in accordance with step (104) by dividing the length of edge 304 by the baseline line spacing and rounding to the nearest integer. Third, the basic raster pattern is mapped 300 to the surface of the rotor blade 310 in accordance with step (106) by aligning the five critical edges 303-307 and allowing the remaining lines to 'elastically' deform in between. Fourth, the surface normals (and Tait Bryan angles) are calculated along the raster lines in accordance with step (108). Fifth, the local traverse velocities are calculated using Equation (1) in accordance with step (110). Sixth, one of the three approaches described above are used to correct for curvature effects in accordance with step (112). Seventh, one of two strategies described above are used to determine the order of layer deposition in accordance with step (114).

The techniques provided by the embodiments herein may be applicable for a spray process with a characteristically Gaussian-shaped deposition profile that is used to form a deposit on a surface. In an example, the following parameters were experimentally used to confirm the accuracy of the embodiments herein. It is noted that the following parameters are only examples, and other parameters, ranges, values, etc. may be utilized in accordance with the embodiments herein, and as such, the embodiments herein are not limited to the following parameters: (i) plume widths from 1 to 10 mm; (ii) layer thicknesses (per-pass thickness) from 0.025 to 0.3 mm; and (iii) thickness gradients from 0 to 0.25 mm per mm surface length or 0 to 12.5 layer thicknesses per plume width.

The embodiments herein are provided to minimize the level of as-sprayed error in near-net-shape of cold spray deposits sprayed onto 3D objects such as rotor blades 310 or other similar surfaces. Forming a shape that is as close to the prescribed shape as possible reduces the expensive process of post-machining or grinding. Additionally, erosion caps 250 made using the techniques provided by the embodiments herein may be distinguished by metallographic examination of a cross-section of the deposit. Characteristics of metallographic cross-sections of a deposit made with the embodiments herein include layers with variable thickness, layer interfaces that conform to the rotor surface contour, well-adhered layers and minimal inter-layer porosity.

The techniques provided by the embodiments herein also minimize the spray time and amount of over-spray, thus reducing the waste of expensive helium and metal powder that is required for the process. Additionally, the embodiments herein provide for locally controlling the deposit thickness to match prescribed non-uniform profiles by considering a relationship between nozzle speed, line spacing, and the number of passes. Moreover, the embodiments herein enforcing the raster mapping to align with the leading edge 303 of the rotor blade 310 to avoid abrupt joint motions. Furthermore, the embodiments herein compensate for curvature effects on thickness by using a 'curvature-correcting' surface, compensating for curvature effects by re-mapping the raster pattern to the current outermost surface after each layer, and compensate for curvature effects by using a corrective factor, which is a function of radius-of-curvature, in the velocity equation.

In some examples, the system 400 may be a stand-alone system or part of another system(s). The processor 410 may include a central processing unit, microprocessors, hardware engines, and/or other hardware devices suitable for retrieval and execution of instructions stored in a machine-readable storage medium 415. The processor 410 may fetch, decode, and execute computer-executable instructions 420 to enable execution of locally-hosted or remotely-hosted applications for controlling action of the system 400. The remotely-hosted applications may be accessible on remotely-located devices; for example, remote communication device 425. For example, the remote communication device 425 may be a computer, tablet device, smartphone, or remote server. As an alternative or in addition to retrieving and executing instructions, processor 410 may include electronic circuits including a number of electronic components for performing the functionality of the computer-executable instructions 420.

The machine-readable storage medium 415 may be any electronic, magnetic, optical, or other physical storage device that stores executable instructions. Thus, the machine-readable storage medium 415 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the machine-readable storage medium 415 may include a non-transitory computer-readable storage medium 415. The machine-readable storage medium 415 may be encoded with executable instructions for enabling execution of remotely-hosted applications accessed on the remote communication device 425.

In an example, the processor 410 of the device robotic additive applicator device 405 executes the computer-executable instructions 420. The computer-executable instructions 420 comprise instructions to receive primary edges data of a surface of a three-dimensional (3D) object; calculate a number of raster lines for applying an additive deposition on the surface; map a raster pattern to the surface of the 3D object; calculate surface normal and rotational angles along the raster lines; calculate a nozzle velocity of an additive application used for producing the additive deposition on the surface; identify curvature effects of the 3D object; and establish an order of performing passes of the additive deposition on the surface based on a selected direction for performing the additive deposition and a consideration of a residual stress profile of a resulting deposit.

The primary edges may comprise a first side edge, a second side edge, a first trailing edge, a second trailing edge, and a leading edge. The number of raster lines may be calculated by dividing a length of the first side edge by a baseline line spacing parameter and rounding to a nearest integer. The raster pattern may be mapped to the surface of the 3D object by aligning the primary edges and allowing remaining raster lines to elastically deform therebetween. The nozzle velocity of the additive deposition may be calculated by Equation (1):

$$\text{local speed} = \text{baseline speed} \times \frac{\text{number of passes} \times \text{baseline thickness per pass}}{\text{local prescribed thickness}} \times \frac{\text{baseline line spacing}}{\text{local line spacing}}.$$

The instructions 420, when executed, may further cause the processor 410 to correct the curvature effects by calculating a curvature corrected surface of the 3D object; and mapping the raster pattern to the curvature corrected surface instead of an actual surface of the 3D object. The instructions 420, when executed, may further cause the processor 410 to correct the curvature effects by mapping the raster pattern to each new surface of the 3D object that is generated after deposition of each layer on the surface. The instructions 420, when executed, may further cause the processor 410 to correct the curvature effects by calculating a compensation factor that is a function of a local radius of curvature of the surface; and using the compensation factor to determine the nozzle velocity. The establishing of the order of performing the additive deposition on the surface may comprise beginning with a widest layer and continuing inward on the surface. The establishing of the order of performing the additive deposition on the surface may comprise beginning with a narrowest layer and continuing outward on the surface.

The embodiments herein offer utility in several applications such as a method for manufacturing rotor blade erosion caps 250 using a multi-axis robotic arm carrying a cold spray applicator device 405. The embodiments herein may provide the robotic motion plan for forming a deposit with well-defined non-uniform thickness on a rotor blade 310 of a generic shape. The motion plan is derived by mapping 300 a standard flat raster pattern to the complex curved surface of the rotor blade 310 and maintaining the applicator orientation to the normal of the surface. A smooth deposit with controlled thickness is obtained by locally modulating the applicator velocity according to a mathematical relationship between the velocity and spacing between consecutive lines of the raster. Accordingly, the cold spray deposit thickness may be reasonably predicted by a mathematical relationship between the applicator velocity and local spacing between consecutive lines of a raster pattern. As such, the embodiments herein may be used to manufacture an erosion cap 250 out of any cold-sprayable powder material. Furthermore, the embodiments herein may be generally used as a part of cold spray additive manufacturing of components for various types of devices and systems including, but not limited to, rotor blade erosion caps, airfoil skins, engine lip skins, missile fin skins, missile nose skins, propeller blade protective coatings, turbine blade leading edge protection, aircraft leading edges, and aircraft engine lip skins.

Cold spray is potentially a useful technology for manufacturing erosion caps 250 and other protective strips on rotor blades 310 and other similarly-shaped objects. The embodiments herein provide a novel motion plan for a multi-axis robot carrying a cold spray applicator device 405. The motion plan is designed to form a near-net-shape deposit with prescribed non-uniform thickness on a complex-shaped rotor blade 310. The motion plan is defined by mapping 300 a standard raster pattern to the surface of the rotor blade 310 and conforming to certain critical edges 303-307. Prescribed non-uniform thickness profiles can be met with high accuracy by modulating the nozzle speed and number of passes in accordance with a defined relationship between the speed, number of passes, and line spacing. The embodiments herein minimize the time required to complete the process, mitigates the waste of materials, and reduces the amount of post-spray grinding or machining required, thus making the process more cost-effective. Moreover, the embodiments herein may be applied to other parts with similar geometric qualities as a rotor blade 310. Additionally, the embodiments herein may be used to manufacture parts out of any cold-sprayable material.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A method of determining a tool path for an additive deposition on a surface, the method comprising:
   receiving primary edges data of the surface of a three-dimensional (3D) object;
   calculating a number of raster lines for applying an additive deposition on the surface;
   mapping a raster pattern to the surface of the 3D object;
   calculating surface normal and rotational angles along the raster lines;
   calculating a nozzle velocity of an additive application used for producing the additive deposition on the surface;
   identifying curvature effects of the 3D object; and
   establishing an order of performing passes of the additive deposition on the surface based on a selected direction for performing the additive deposition and a consideration of a residual stress profile of a resulting deposit.

2. The method of claim 1, wherein the primary edges comprise a first side edge, a second side edge, a first trailing edge, a second trailing edge, and a leading edge.

3. The method of claim 2, wherein the number of raster lines is calculated by dividing a length of the first side edge by a baseline line spacing parameter and rounding to a nearest integer.

4. The method of claim 1, wherein the raster pattern is mapped to the surface of the 3D object by aligning the primary edges and allowing remaining raster lines to elastically deform therebetween.

5. The method of claim 1, wherein the nozzle velocity of the additive deposition is calculated by:

$$\text{local speed} = \text{baseline speed} \times \frac{\text{number of passes} \times \text{baseline thickness per pass}}{\text{local prescribed thickness}} \times \frac{\text{baseline line spacing}}{\text{local line spacing}}.$$

6. The method of claim 5, comprising correcting the curvature effects by:
   calculating a compensation factor that is a function of a local radius of curvature of the surface; and
   using the compensation factor to determine the nozzle velocity.

7. The method of claim 1, comprising correcting the curvature effects by:
   calculating a curvature corrected surface of the 3D object; and
   mapping the raster pattern to the curvature corrected surface instead of an actual surface of the 3D object.

8. The method of claim 1, comprising correcting the curvature effects by mapping the raster pattern to each new surface of the 3D object that is generated after deposition of each layer on the surface.

9. The method of claim 1, wherein the establishing of the order of performing the additive deposition on the surface comprises beginning with a widest layer and continuing inward on the surface.

10. The method of claim 1, wherein the establishing of the order of performing the additive deposition on the surface comprises beginning with a narrowest layer and continuing outward on the surface.

11. A machine-readable storage medium comprising computer-executable instructions that when executed cause a processor of a robotic additive applicator device to:
   receive primary edges data of a surface of a three-dimensional (3D) object;
   calculate a number of raster lines for applying an additive deposition on the surface;

map a raster pattern to the surface of the 3D object;

calculate surface normal and rotational angles along the raster lines;

calculate a nozzle velocity of an additive application used for producing the additive deposition on the surface;

identify curvature effects of the 3D object; and establish an order of performing passes of the additive deposition on the surface based on a selected direction for performing the additive deposition and a consideration of a residual stress profile of a resulting deposit wherein the machine-readable storage medium is limited to non-transitory mediums.

12. The machine-readable storage medium of claim 11, wherein the primary edges comprise a first side edge, a second side edge, a first trailing edge, a second trailing edge, and a leading edge.

13. The machine-readable storage medium of claim 12, wherein the number of raster lines is calculated by dividing a length of the first side edge by a baseline line spacing parameter and rounding to a nearest integer.

14. The machine-readable storage medium of claim 11, wherein the raster pattern is mapped to the surface of the 3D object by aligning the primary edges and allowing remaining raster lines to elastically deform therebetween.

15. The machine-readable storage medium of claim 11, wherein the nozzle velocity of the additive deposition is calculated by:

$$\text{local speed} = \text{baseline speed} \times \frac{\text{number of passes} \times \text{baseline thickness per pass}}{\text{local presecribed thickness}} \times \frac{\text{baseline line spacing}}{\text{local line spacing}}.$$

16. The machine-readable storage medium of claim 15, wherein the instructions, when executed, further cause the processor to correct the curvature effects by:

calculating a compensation factor that is a function of a local radius of curvature of the surface; and using the compensation factor to determine the nozzle velocity.

17. The machine-readable storage medium of claim 11, wherein the instructions, when executed, further cause the processor to correct the curvature effects by:

calculating a curvature corrected surface of the 3D object; and mapping the raster pattern to the curvature corrected surface instead of an actual surface of the 3D object.

18. The machine-readable storage medium of claim 11, wherein the instructions, when executed, further cause the processor to correct the curvature effects by mapping the raster pattern to each new surface of the 3D object that is generated after deposition of each layer on the surface.

19. The machine-readable storage medium of claim 11, wherein the establishing of the order of performing the additive deposition on the surface comprises beginning with a widest layer and continuing inward on the surface.

20. The machine-readable storage medium of claim 11, wherein the establishing of the order of performing the additive deposition on the surface comprises beginning with a narrowest layer and continuing outward on the surface.

* * * * *